United States Patent
Di Censo et al.

(10) Patent No.: US 11,505,103 B2
(45) Date of Patent: Nov. 22, 2022

(54) VEHICLE PRIVACY SCREEN

(71) Applicant: Faurecia Interior Systems, Inc., Auburn Hills, MI (US)

(72) Inventors: Davide Di Censo, Sunnyvale, CA (US); Cedric Ketels, Mountain View, CA (US); Thomas Dessapt, Sunnyvale, CA (US); Robert Fitzpatrick, Holland, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 78 days.

(21) Appl. No.: 16/880,654

(22) Filed: May 21, 2020

(65) Prior Publication Data

US 2021/0362636 A1  Nov. 25, 2021

(51) Int. Cl.
*B60N 2/90* (2018.01)
*B60R 13/08* (2006.01)
*E06B 9/36* (2006.01)

(52) U.S. Cl.
CPC ............... *B60N 2/91* (2018.02); *B60R 13/08* (2013.01); *E06B 9/36* (2013.01)

(58) Field of Classification Search
CPC ......... B60N 2/91; B60R 21/026; B60R 21/06; B60R 13/0823
USPC ....................... 296/24.46, 24.42; 160/DIG. 2
See application file for complete search history.

(56) References Cited

U.S. PATENT DOCUMENTS

| | | | | |
|---|---|---|---|---|
| 1,611,248 A * | 12/1926 | Smith | ..................... | B62D 31/00 |
| | | | | 296/24.46 |
| 2,495,520 A * | 1/1950 | Grimm | ..................... | B60N 2/14 |
| | | | | 296/65.07 |
| 4,588,223 A * | 5/1986 | Ledenyi | .................. | B60R 21/12 |
| | | | | 160/84.06 |
| 4,595,227 A * | 6/1986 | Setina | ..................... | B60R 21/12 |
| | | | | 296/24.46 |
| 8,517,444 B2 * | 8/2013 | D'Alessandro | ....... | B60R 21/026 |
| | | | | 296/24.43 |
| 8,833,831 B2 * | 9/2014 | Manzke, Jr. | .......... | B60R 21/026 |
| | | | | 296/24.4 |

(Continued)

FOREIGN PATENT DOCUMENTS

| | | | | |
|---|---|---|---|---|
| DE | 102006005497 A1 * | 8/2007 | ........... | B60R 21/026 |
| EP | 3378708 A1 * | 9/2018 | ........... | B60R 21/026 |

(Continued)

OTHER PUBLICATIONS

"My Experience with Shanghai Taxi Scammer & How to Avoid Being Ripped Off", accessed on May 6, 2020 at https://www.topmiles.com/news/article/32/my-experience-with-a-shanghai-taxi-scammer—how-to-avoid-being-ripped-off, 4 pages.

*Primary Examiner* — Jason S Morrow
*Assistant Examiner* — Wenwei Zhuo
(74) *Attorney, Agent, or Firm* — Reising Ethington P.C.

(57) ABSTRACT

A privacy screen for a vehicle that can provide for an enhanced passenger experience. The privacy screen includes a blocking body configured to at least partially shroud a shielded seat of the vehicle. The blocking body has an inner seat facing surface, an outer shielding surface, and a concave contour that is configured to extend at least partially around the shielded seat. The privacy screen further includes a passenger enhancement feature that is configured to be controllable via input from a passenger of the vehicle that is remote from a driver of the vehicle.

14 Claims, 4 Drawing Sheets

(56) References Cited

U.S. PATENT DOCUMENTS

| | | |
|---|---|---|
| 9,956,898 B1 * | 5/2018 | Dellock ................. B60K 37/04 |
| 10,046,685 B1 | 8/2018 | Bryant et al. |
| 10,059,238 B1 | 8/2018 | Salter et al. |
| 2019/0100151 A1 | 4/2019 | Tait |
| 2020/0298674 A1 * | 9/2020 | Staser ................. B60R 11/0235 |

FOREIGN PATENT DOCUMENTS

| | | | |
|---|---|---|---|
| FR | 3070940 A1 | 3/2019 | |
| WO | WO-0050269 A1 * | 8/2000 | ........... B60R 21/026 |
| WO | WO-2018225472 A1 * | 12/2018 | ............... B60N 3/00 |
| WO | WO2018225472 A1 | 12/2018 | |

\* cited by examiner

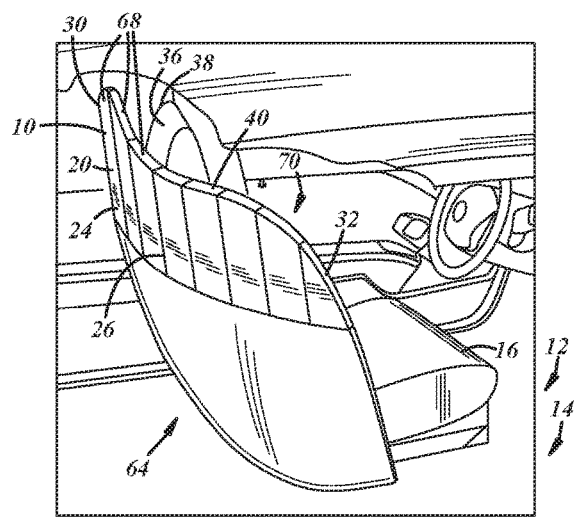 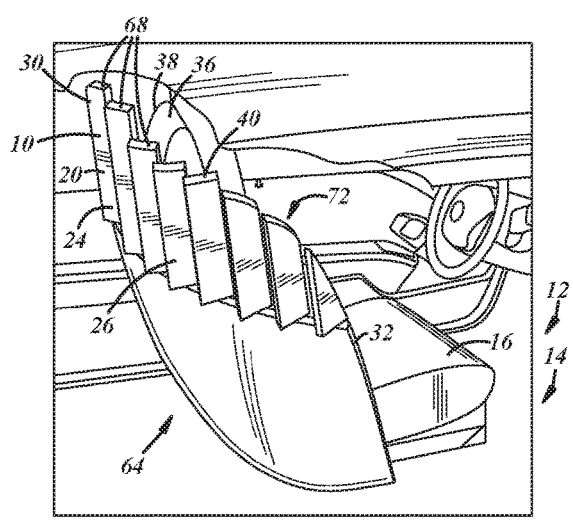
FIG. 6  FIG. 7

VEHICLE PRIVACY SCREEN

TECHNICAL FIELD

The present disclosure is related generally to vehicle interiors and, more particularly, to privacy screens for vehicle interiors.

BACKGROUND

Privacy screens are oftentimes used in vehicles to visually and/or acoustically isolate one or more vehicle passengers from the driver, and vice versa. While some privacy screens include features such as displays, as described in PCT Publication WO 2018/225472 to Shogo et al., the structure of the privacy screen itself in such implementations has the potential to be bulky and obtrusive. A more streamlined and potentially modular solution is desirable, along with providing more control and functionality capability to the passenger.

SUMMARY

An illustrative privacy screen includes a blocking body configured to at least partially shroud a shielded seat. The blocking body has an inner seat facing surface, an outer shielding surface, and a concave contour that is configured to extend at least partially around the shielded seat. The privacy screen further includes a passenger enhancement feature that is configured to be controllable via input from a passenger of the vehicle that is remote from a driver of the vehicle.

In various embodiments, the blocking body has a first saddle edge and a second saddle edge with the concave contour between the first saddle edge and the second saddle edge.

In various embodiments, the first saddle edge is configured to be at least partially aligned with a headrest of the shielded seat.

In various embodiments, the first saddle edge is configured to be at least partially aligned with a seat bottom of the shielded seat.

In various embodiments, the blocking body has an angular view permitting edge that connects the first saddle edge and the second saddle edge, wherein the angular view permitting edge provides for an unobstructed view of the driver toward a rearview mirror of the vehicle.

In various embodiments, the passenger enhancement feature comprises a display on the outer shielding surface.

In various embodiments, the display is created by a projector configured to project an image onto the outer shielding surface.

In various embodiments, the passenger enhancement feature comprises a display screen mounted adjacent a foldable portion on the blocking body.

In various embodiments, the passenger enhancement feature comprises an audio delivery system integrated in the blocking body.

In various embodiments, the blocking body includes a plurality of auditory shielding facets.

In various embodiments, the blocking body is foldable along at least some of the auditory shielding facets of the plurality of auditory shielding facets.

In various embodiments, the passenger enhancement feature comprises a deployment mechanism configured to allow movement of the blocking body between a stowed position and a deployed position.

In various embodiments, the blocking body is removable and fully detachable from the vehicle.

In various embodiments, the blocking body comprises a plurality of vertical louvers.

In various embodiments, the vertical louvers are configured to pivot between an open position to facilitate conversation and a closed position to provide privacy.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein:

FIG. 6 shows another embodiment of a privacy screen in a closed position; and FIG. 7 shows the privacy screen of FIG. 6 in an open position.

DESCRIPTION OF ILLUSTRATIVE EMBODIMENTS

Described herein is a privacy screen that is advantageously used in ride sharing or ride hailing vehicles to provide one or more passenger enhancement features. The privacy screen comprises a blocking body which has a more streamlined shape than typical planar or flat privacy screens that are more ubiquitous in vehicle-based applications. The privacy screen also includes one or more passenger enhancement features, which are designed to provide a passenger of the vehicle with greater control and a more desirable ride experience.

Figure 1:
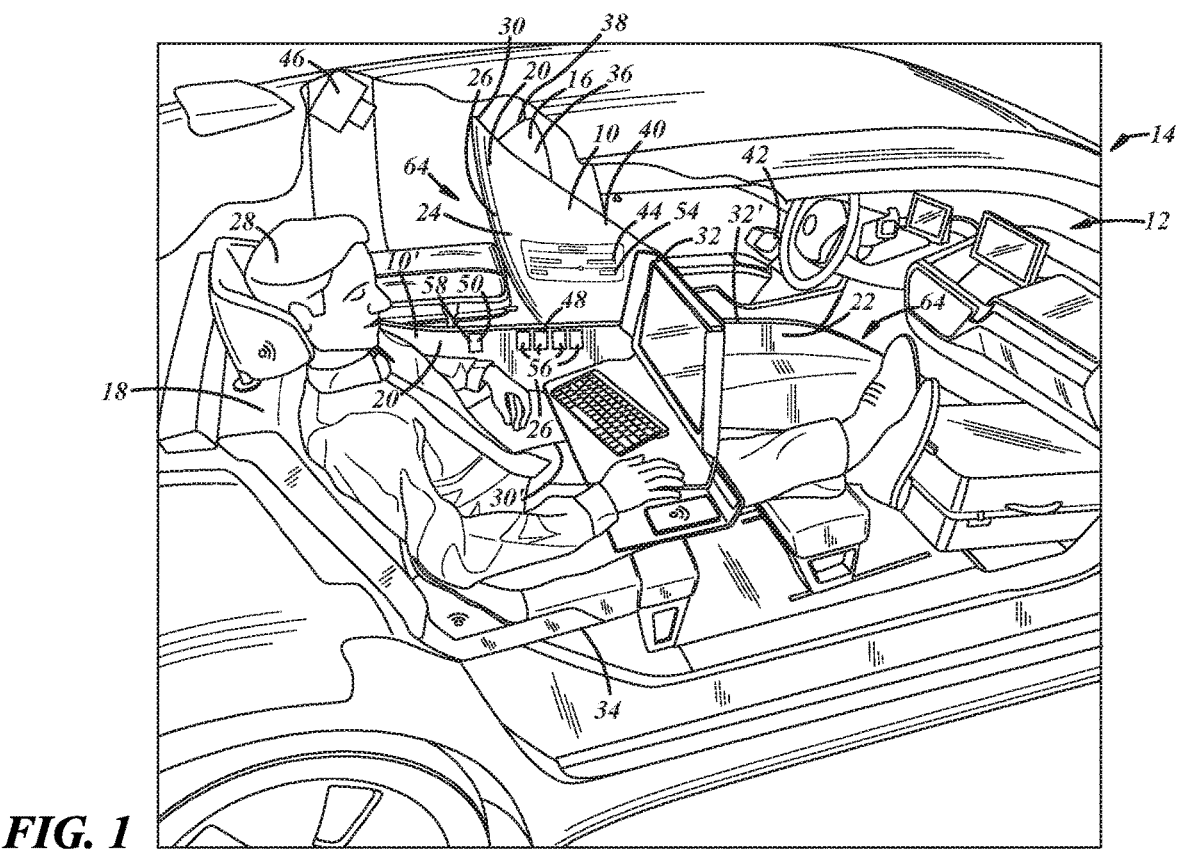
FIG. 1 is a perspective view of the interior of a vehicle passenger cabin equipped with two embodiments of a privacy screen.

FIG. 1 shows two embodiments of a privacy screen 10, 10' within an interior passenger cabin 12 of a vehicle 14. The privacy screen 10 shields the driver's seat 16 of the vehicle 14 (i.e., the driver's seat 16 is the shielded seat with respect to the privacy screen 10), and the privacy screen 10' shields a rear passenger seat 18 of the vehicle 14 (i.e., the rear passenger seat 18 is the shielded seat with respect to the privacy screen 10'). While the present description is primarily focused on the privacy screen implementation 10, which is installed on the driver's seat 16, features and functionality relating to the privacy screen 10 may be applicable to other embodiments, such as the privacy screen 10', and vice versa.

The privacy screen 10 includes a main blocking body 20 configured to at least partially shroud the shielded seat 16. The blocking body 20 has an inner seat facing surface 22, an outer shielding surface 24, and a concave contour 26. The concave contour 26, along the inner seat facing surface 22 of the privacy screen 10, forms a convex contour along the outer shielding surface 24. This structure of the concave contour 26 provides a more streamlined appearance and is less obtrusive, as its conformational shape takes up less space in the vehicle interior 12 than a typical planar or flat privacy screen. The privacy screen 10 also includes one or more passenger enhancement features that are configured to be controllable via input from a passenger 28 of the vehicle 14 that is remote from the driver in the driver's seat 16. The passenger enhancement features are detailed more fully below, but in general, the passenger enhancement features are included to provide an improved riding experience to a non-driving passenger of the vehicle. This can be particularly advantageous in ride-hailing and ride-sharing vehicle implementations. Moreover, as opposed to more typical privacy screens in taxi cabs and limousines, the privacy screens 10, 10' do not fully segregate the driver into another area within the passenger cabin 12. This can allow the driver in a ride-hailing or ride-sharing scenario to more easily switch between commercial and non-commercial usage of the vehicle 14.

The blocking body 20 includes a first saddle edge 30 and a second saddle edge 32 with the concave contour 26 extending therebetween. This structure can improve the shielding capacity of the screen 10 while minimizing obtrusiveness within the vehicle cabin 12 and maximizing interior space. In the embodiment for the non-driver passenger's seat 18, the first saddle edge 30' of the privacy screen 10' is at least partially aligned with the seat bottom 34 of the seat 18. The second saddle edge 32' extends the longitudinal length of the vehicle interior cabin 12 from the rear of the vehicle all the way through the front and along side the front driver's seat 16. In the embodiment for the driver's seat 16, the first saddle edge 30 of the privacy screen 10 is at least partially aligned with an outer edge of the headrest 36 (the outer edge facing towards the nearest door, which provides greater shielding capacity). In the embodiment of the privacy screen 10, an angular view permitting edge 40 connects the first saddle edge 30 and the second saddle edge 32. The angular view permitting edge 40 provides for an unobstructed view toward a rearview mirror of the vehicle 14 (the rearview mirror on the opposite side of the vehicle as the rearview mirror 42). The structure of the angular view permitting edge 40 creates a structured blocking body 20 having a first saddle edge 30 that is more than twice as long as the second saddle edge 32.

The blocking body 20 can be made of any operable material, and the type of material used may be dependent on one or more of the passenger enhancement features. In the embodiment illustrated in FIG. 1, the passenger enhancement feature is a display 44 located on the outer shielding surface 24 of the blocking body 20. In this particular embodiment, the display 44 is created by a projector 46. For such an embodiment, it may be more advantageous to use a lighter colored material for the blocking body 20. The blocking body 20 may be rigid or soft to the touch, depending on the desired implementation. Example materials include textiles, leather or synthetic leather, wood, plastic, or rubber to cite a few examples. The blocking body 20 may be made from a single sheet or layer of material, or in some embodiments, may have a multi-layer structure (e.g., a sound dampening foam material between two outer skin layers). In some implementations, parts or subcomponents of the blocking body 20 may be made of one material, while the remainder of the blocking body is made of a different material. In yet other implementations, all or a portion of the blocking body 20 may be a clear plastic or a semi-transparent fabric that is backlit. A diffuser may be included to achieve a desired backlit appearance. It can also be advantageous to use a material that can be easily cleaned and/or sanitized. A coating or the like that helps to reduce the transmission or bacteria and/or viruses may also be used. Hygienic configurations (e.g., smoother surfaces, less grooves, etc.) can be beneficial as well. Other example materials and configurations for the blocking body 20 are certainly possible.

The blocking body 20 can be part of the seat structure such that it deploys directly from the seat 16, 18, or it may be a separate element or component which is removable and fully detachable from the vehicle 14. Having the screen 10 be removable and fully detachable allows for after-market potential, and may be better in ride-sharing or ride-hailing scenarios. The blocking body 20 can thus be fixed, removable and/or extendable, and it can be anchored or otherwise attached at any operable location within the cabin 12, such as the back panel of the driver's seat 16, the driver's headrest 36, the ceiling of the vehicle 14, the floor of the vehicle, the center console armrest, the rear passenger seat 18, or a multipurpose box that replaces the front, non-driver passenger seat, to cite a few examples.

The privacy screen 10 includes one or more passenger enhancement features that are configured to be controllable via input from the passenger 28 of the vehicle 14. The passenger enhancement features include any number of functionalities, attributes, etc. that relate to the privacy screen 10 and improve the passenger's experience, particularly a passenger in the rear seat 18. A few examples include a display 44, an audio delivery system 48, a deployment mechanism 50, and a supplemental auditory shield, such as the auditory shielding facets 52 illustrated in FIGS. 4 and 5. Other passenger enhancement features are possible.

In some embodiments, the privacy screen 10 includes a display 44 as the passenger enhancement feature. The display 44 is controllable via input from the passenger 28. For example, the display 44 can be turned on and/or off by the passenger 28, and in some embodiments, the display 44 may be selectively controllable by the passenger 28 (e.g., the display 44 may be used by the passenger 28 to show media content accessible via a mobile device being carried by the passenger, the position of the display can be adjusted, etc.).

In the embodiment of FIG. 1, the display 44 is created by the projector 46, which is configured to project an image 54 onto the outer shielding surface 24. The projector 46 can be mounted in any operable location, such as the roof or headliner of the vehicle 14 as shown, in the rear passenger's seat 18, in the vehicle trim (e.g., the B-pillar), in a rear armrest and/or console, or within the privacy screen itself (e.g., the projector 46 would be mounted on the rear of the driver's seat 16 and then backlight the image 54 onto the privacy screen 10). In another embodiment, instead of using the projector 46, the display 44 may be a flexible display which is integrated within the blocking body 20. Further, while the display is visible on the outer shielding surface 24 of the blocking body 20 in the illustrated embodiments, it may be possible, such as with the privacy screen 10', to integrate the display 44 on the inner seat facing surface 22.

Figure 2:
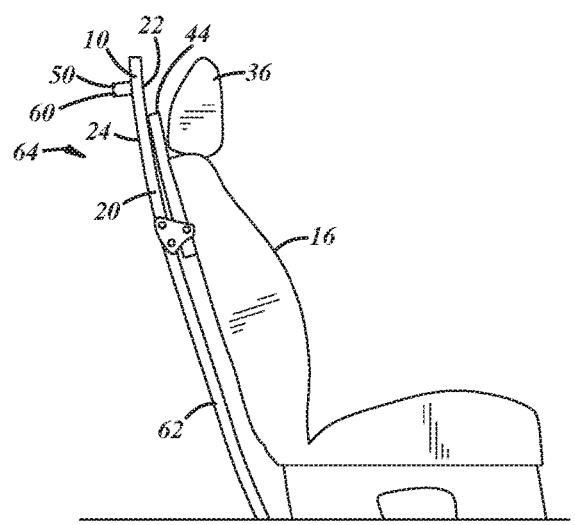
FIG. 2 schematically illustrates another embodiment of a privacy screen in a deployed position.
Figure 3:
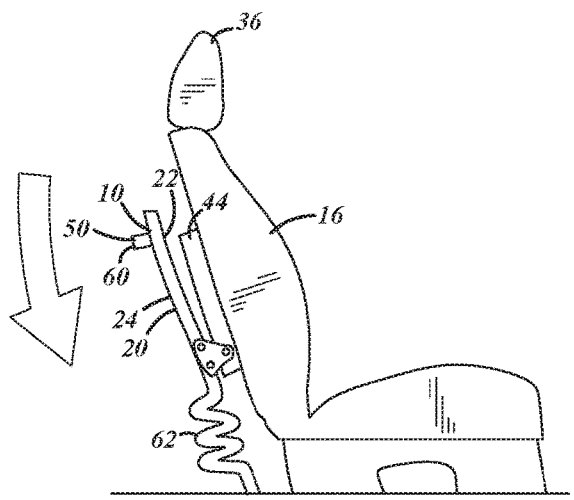
FIG. 3 schematically illustrates the privacy screen of FIG. 2 in a stowed position.

FIGS. 2 and 3 illustrate yet another embodiment of a privacy screen 10 having a display 44. In the embodiments of FIGS. 2 and 3, the privacy screen 10 is shown partially cutaway and in cross-section so as to show a separate screen display 44 that moves with the blocking body 20. The display 44 in this embodiment is mounted to the inner seat facing surface 22 of the blocking body 20. A track system or the like may be integrated on the rear of the seat 16 to help facilitate and/or control movement of the display 44. Additionally, the display 44 can receive power and/or media input through connections within the seat 16. In the embodiment illustrated in FIGS. 2 and 3, it is beneficial to have a fully or partially transparent blocking body 20 to allow for viewing of the display 44 by a passenger in the rear of the vehicle.

Returning to FIG. 1, an audio delivery system 48 is schematically illustrated, which may be included within the blocking body 20 as a passenger enhancement feature. The audio delivery system 48 is controllable via input from the passenger 28. For example, the audio delivery system 48 can be turned on and/or off by the passenger 28, and in some embodiments, the audio delivery system 48 may be selectively controllable by the passenger 28 (e.g., the audio delivery system 48 may be used by the passenger 28 to play or stream music accessible via a mobile device being carried by the passenger, the volume may be adjustable, etc.).

The audio delivery system 48 may include speakers 56. The speakers 56 can be one or more loud speakers, microbeam forming speaker arrays, ultrasound speakers etc. Microbeam forming speaker arrays may be advantageous as a passenger enhancement feature, as the software implemented to control the speakers 56 can impart directionality to the emitted soundwaves. This can better focus the output toward the passenger 28. Speakers 56 in other embodiments may advantageously be ultrasound speakers which can be integrated, for example, into a fabric or flexible blocking body 20. Other speaker type and arrangements are certainly possible. For example, while FIG. 1 illustrates speakers 56 that are integrated into the inner seat facing surface 22 of the privacy screen 10', it is possible to integrate them into the outer shielding surface 24, such as with the privacy screen 10 attached to the driver's seat 16.

A deployment mechanism 50 may also be included as a passenger enhancement feature. The deployment mechanism 50 is controllable via input from the passenger 28. For example, the deployment mechanism 50 may include a button 58 as shown in FIG. 1 that is actuatable by the passenger 28. Pressing the button may cause the privacy screen 10 to move between a deployed position as shown, and a stowed position (e.g., the privacy screen 10 may electronically fold or recess toward the first saddle edge 30, it may move into a compartment in the rear of the driver's seat 16, etc.). Other deployment mechanisms 50 are certainly possible, such as a dial, an adjustable slider, switch, etc. FIGS. 2 and 3 illustrate a handle 60 that can be used as a deployment mechanism 50. In this example, a foldable portion 62 is located within the blocking body 20 so that a manual force to the handle 60 allows the passenger 28 to control the position of the blocking body. Accordingly, the blocking body 20 is movable between a deployed position 64 (FIG. 2) and a stowed position 66 (FIG. 3).

Figure 4:
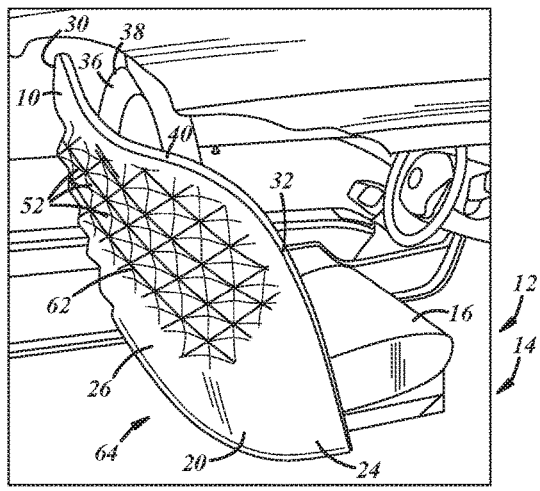
FIG. 4 shows another embodiment of a privacy screen in a deployed position.
Figure 5:
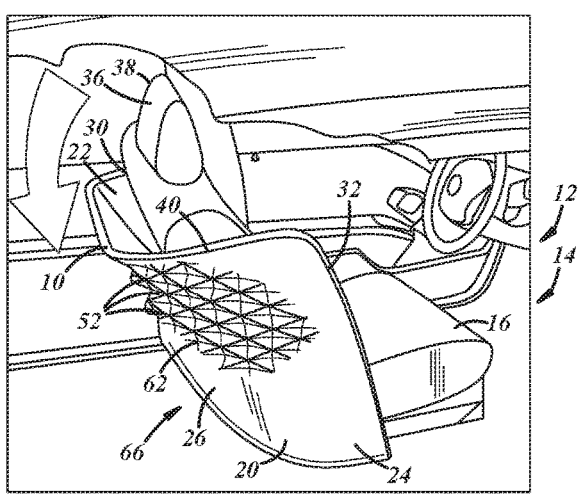
FIG. 5 shows the privacy screen of FIG. 4 in a stowed position.

FIGS. 4 and 5 show another embodiment of a foldable portion 62 in the blocking body 20 created by a plurality of auditory shielding facets 52. Only a few auditory shielding facets 52 are labeled in FIGS. 4 and 5 for clarity purposes. The blocking body 20 is foldable along each of the auditory shielding facets 52 such that the blocking body can move between a deployed position 64 (FIG. 4) and a stowed position 66 (FIG. 5). In FIGS. 4 and 5, auditory shielding facets 52 create a supplemental auditory shield beyond the structure and shape of the blocking body 20 itself, as their structure can further diffuse sound. The position of the auditory shielding facets 52 are controllable by the passenger so as to impact the degree of acoustic isolation between the seats of the vehicle. Movement between the deployed position 64 and the stowed position 66 can be manual or electronic.

FIGS. 6 and 7 illustrate a privacy screen 10 that includes a plurality of vertical louvers 68 that are movable between a closed position 70 to provide privacy (FIG. 6) and an open position 72 to facilitate conversation (FIG. 7). Only a few of the louvers 68 are labeled in FIGS. 6 and 7 for clarity purposes. The degree to which the louvers 68 are pivoted may be controllable by the passenger so as to impact the degree of acoustic isolation between the seats of the vehicle. The position may be electronically adjustable (e.g., via an electronic motor) or manually adjustable (e.g., a knob or the like is mechanically attached to one or more of the louvers 68 to facilitate the pivoting motion). Further, in this embodiment, it is possible to have a lower portion 74 of the privacy screen 10 serve as a compartment for the louvers 68. Thus, the louvers 68 of the blocking body 20 can be deployed in a deployed position 64 as shown, and then recessed into a compartment or lower portion 74 when more complete openness is desired between the vehicle seats. Other configurations for the blocking body 20 are certainly possible.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A privacy screen for a vehicle, comprising:
   a blocking body configured to at least partially shroud a shielded seat, the blocking body configured for installation on or direct contact with the shielded seat, the blocking body having an inner seat facing surface, an outer shielding surface, and a concave contour that is configured to extend at least partially around the shielded seat, wherein the blocking body is removable and fully detachable from the vehicle; and
   a passenger enhancement feature that is configured to be controllable via input from a passenger of the vehicle that is remote from a driver of the vehicle.

2. The privacy screen of claim 1, wherein the blocking body has a first saddle edge and a second saddle edge with the concave contour between the first saddle edge and the second saddle edge.

3. The privacy screen of claim 2, wherein the first saddle edge is configured to be at least partially aligned with a headrest of the shielded seat.

4. The privacy screen of claim 2, wherein the first saddle edge is configured to be at least partially aligned with a seat bottom of the shielded seat.

5. A privacy screen for a vehicle, comprising:
   a blocking body configured to at least partially shroud a shielded seat, the blocking body configured for installation on or direct contact with the shielded seat, the blocking body having an inner seat facing surface, an outer shielding surface, and a concave contour that is configured to extend at least partially around the shielded seat, wherein the blocking body has a first saddle edge and a second saddle edge with the concave contour between the first saddle edge and the second saddle edge, and wherein the blocking body has an angular view permitting edge that connects the first saddle edge and the second saddle edge, wherein the angular view permitting edge provides for an unobstructed view of the driver toward a rearview mirror of the vehicle; and a passenger enhancement feature that is configured to be controllable via input from a passenger of the vehicle that is remote from a driver of the vehicle.

6. The privacy screen of claim 1, wherein the passenger enhancement feature comprises a display on the outer shielding surface.

7. The privacy screen of claim 6, wherein the display is created by a projector configured to project an image onto the outer shielding surface.

8. The privacy screen of claim 1, wherein the passenger enhancement feature comprises a display screen mounted adjacent a foldable portion on the blocking body.

9. The privacy screen of claim 1, wherein the passenger enhancement feature comprises an audio delivery system integrated in the blocking body.

10. The privacy screen of claim 1, wherein the blocking body includes a plurality of auditory shielding facets.

11. The privacy screen of claim 10, wherein the blocking body is foldable along at least some of the auditory shielding facets of the plurality of auditory shielding facets.

12. A privacy screen for a vehicle, comprising:
a blocking body configured to at least partially shroud a shielded seat, the blocking body configured for installation on or direct contact with the shielded seat, the blocking body having an inner seat facing surface, an outer shielding surface, and a concave contour that is configured to extend at least partially around the shielded seat; and
a passenger enhancement feature that is configured to be controllable via input from a passenger of the vehicle that is remote from a driver of the vehicle, wherein the passenger enhancement feature comprises a deployment mechanism configured to allow movement of the blocking body between a stowed position and a deployed position.

13. The privacy screen of claim 1, wherein the blocking body comprises a plurality of vertical louvers.

14. The privacy screen of claim 13, wherein the vertical louvers are configured to pivot between an open position to facilitate conversation and a closed position to provide privacy.

* * * * *